UNITED STATES PATENT OFFICE.

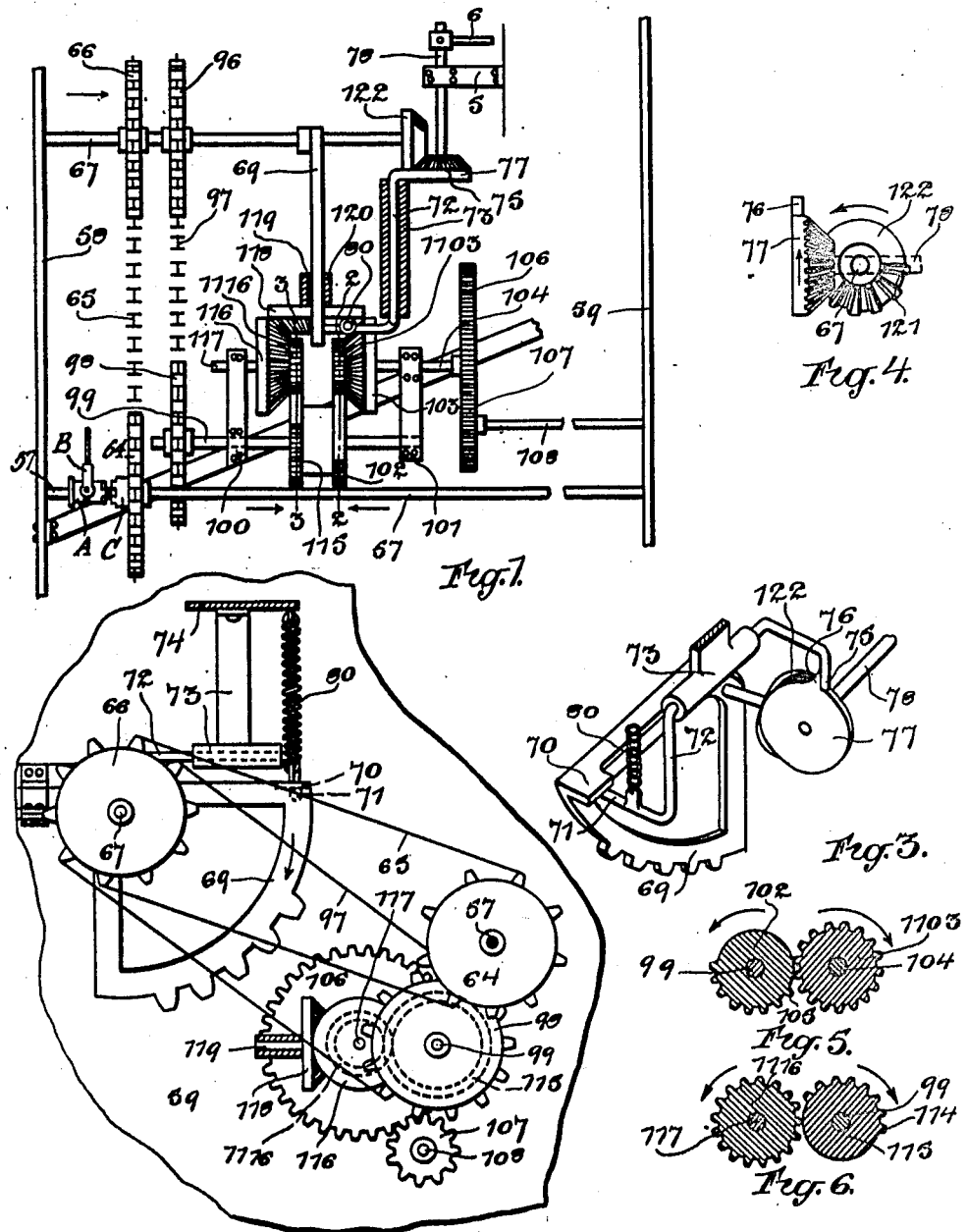

GUY DESMOND GRIFFITHS, OF ACME, ALBERTA, CANADA.

GEARING.

1,087,117.   Specification of Letters Patent.   Patented Feb. 17, 1914.

Original application filed October 5, 1911, Serial No. 653,020. Divided and this application filed May 6, 1912. Serial No. 695,526.

*To all whom it may concern:*

Be it known that I, GUY DESMOND GRIFFITHS, a subject of the King of Great Britain, residing at Acme, Alberta, Canada, have invented certain new and useful Improvements in Gearing, of which the following is a specification.

My invention relates to improvements in gearing, and the object of my invention is to design certain gearing which will be automatically thrown into operation so as to turn a second shaft in both directions around its longitudinal axis, and to turn a first shaft in one direction around its longitudinal axis, and the invention comprises a first shaft and a second shaft; a driven shaft; trains of gearing intermediate said driven shaft and said first and second shafts, the said train of gearing being of particular construction and operating at different times and certain elements thereof being turned in one direction and then turned in the opposite direction, to control the movements of said first and second shafts, suitable clutch mechanism being used to control energy from said driven shaft, as hereinafter more particularly set forth.

Although this gearing is capable of general application, and I shall so describe it, still it is designed to be particularly used in connection with the grain shockers disclosed in the parent application. This present application is a division from the parent application for improvements in grain shockers, filed October 5, 1911, under Serial No. 653020.

Figure 1 is a plan view of my gearing. Fig. 2 is a side elevation thereof, certain parts being shown in section; Fig. 3 is a perspective view of the sector and trip-dog operated thereby, coacting to alternately lock and release a train of gearing; Fig. 4 is a detail view of certain gearing in normal position whereby the second shaft is positively rotated in a given direction; Fig. 5 is a vertical cross section on the line 2—2, Fig. 1, and Fig. 6 is a vertical cross section on the line 3—3, Fig. 1.

In the drawings, like characters of reference indicate corresponding parts in each figure.

57 is a driven shaft journaled in suitable bearings 58 and 59. The shaft 57 is always rotating when the machine this gearing is incorporated with is in use. By any suitable clutch such as A splined on the shaft 57 and controlled by the arm B, which arm may be operated manually or otherwise, the sprocket wheel 64 loosely journaled on the shaft 57 is designed to be clutched to said shaft at certain times through the medium of its hub C, and consequently said sprocket wheel is rotated. By reason of the sprocket chain 65 energy is conveyed to the sprocket wheel 66 keyed to the shaft 67 journaled in suitable bearings, only one bearing, 58, being illustrated. The movement of the shaft 67 moves the quadrant 69 keyed thereto in the direction indicated by the arrow in Fig. 2.

70 is a lug carried by the quadrant 69, and this lug normally rests in contact with the heel 71 of the dog 72 which is journaled in the bearing 73 which is supported by the bracket 74. The toe 75 of the said dog is normally in the path of movement of the lug 76 carried by the beveled pinion 77 keyed to the first shaft 78 which is mounted in suitable bearings 5, one only of which is shown. 80 is a spring connecting the heel 71 of the said dog with the bracket 74, for normally keeping the toe 75 in the path of movement of the lug 76 and keeping the heel 71 against the lug 70. When the quadrant 69 commences to move as described, the dog 72 is operated so that its toe 75 will move out of the path of movement of the lug 76, therefore permitting an arm or lever 6 carried by the shaft 78 to swing downward and so turn said shaft.

Keyed to the shaft 67 is a sprocket wheel 96 which is connected by the sprocket chain 97 with the sprocket wheel 98 which is keyed on the shaft 99 mounted in the bearings 100 and 101. Keyed to the shaft 99 is a spur gear 102 which is only partially provided with teeth. This spur gear 102 coacts with a spur gear 1103 carried by the beveled pinion 103 keyed to the shaft 104 journaled in the bearing 101. The normal position of the spur gears 102 and 1103 is illustrated in Fig. 5. The tooth 105 of the spur gear 102 is normally positioned so that it comes into mesh with the teeth of the spur gear 1103 immediately the lever 6 or its equivalent means, has dropped, so that the teeth of the spur gear 102 will turn the spur gear 1103 and so turn the beveled pinion 103 a certain distance. Now keyed to the shaft 104 is a gear wheel 106 constantly in mesh with the pinion 107 keyed to the second shaft 108 mounted in any suitable bearings, only one, 59 being illustrated, thus turning this shaft the desired number of revolutions in one direction. So soon as this shaft has been turned the desired number of times in the direction described, the tooth 114 of the spur gear 115 keyed to the shaft 99, comes into mesh with the spur gear 1116 carried by the beveled pinion 116 keyed to the shaft 117 journaled in the bearing 100. The beveled pinion 116 is constantly in mesh with the beveled pinion 118 mounted by its shaft 119 in the bearing 120. The beveled pinions 116, 118, and 103 are fully provided with teeth, and as the beveled pinions 116 and 103 are constantly in mesh with the pinion 118, as a result of the coaction between the spur gears 115 and 1116, and beveled pinion 116, the second shaft 108 is turned in the opposite direction to that already described, the desired number of revolutions. Immediately the shaft 108 has been turned as just described, the tooth 121 of the beveled pinion 122 keyed to the shaft 67, comes into mesh with the beveled pinion 77 keyed to the shaft 78 and consequently the said shaft 78 is turned so as to move the lever or arm 6 into such position that when the said shaft is again unlocked, the said lever or arm will move it on its axis in one direction. So soon as the said first shaft 78 and the said second shaft 108 have been turned as described, the clutch mechanism A and B will be operated to unclutch the sprocket wheel 64 from the shaft 57 so as to bring the said gearing to rest. When it is desired to again operate the said shafts as already described, the clutch mechanism A and B will be operated to clutch the sprocket wheel 64 to the shaft 57.

The quadrant 69 of course makes a complete revolution around its shaft 67.

Various changes may be made in construction without departing from the spirit of my invention.

I claim—

1. In a machine of the class described, the combination of a frame; a shaft journaled in said frame; a full-toothed beveled-pinion keyed to said shaft provided with a lug; a spring-controlled dog mounted in a bearing carried by said frame and normally engaged by said lug; another shaft extending substantially at right angles to said first-mentioned shaft; a member journaled on said other shaft and normally in the path of movement of said dog, and means whereby said other shaft is operated to move said member to tilt said dog to move it out of the path of movement of said lug to unlock said lug-provided beveled pinion at certain times.

2. In a machine of the class described, the combination of a frame; a shaft journaled therein; a first, a second, and a third full tooth-provided beveled pinion journaled in said frame and all constantly in mesh; a spur gear carried by said first and third beveled pinions and opposite each other, means whereby energy is transmitted from said third beveled pinion to said shaft; another shaft journaled in said frame; a spur gear partially provided with teeth, keyed to said other shaft, and co-acting with said spur gear carried by said first-mentioned beveled pinion; another spur gear partially provided with teeth, also keyed to said other shaft and co-acting with the spur gear carried by said third beveled pinion; a driven shaft journaled in said frame, and a sprocket wheel loosely journaled on said driven shaft; means whereby energy is transmitted from said sprocket wheel to said other shaft, and suitable clutch mechanism mounted on said driven shaft whereby said sprocket wheel is clutched to said driven shaft so that said first-mentioned shaft will be first turned in one direction and then turned in the opposite direction, for the purpose specified.

3. In a machine of the class described, the combination of a frame; a first-shaft journaled in said frame; a full tooth provided beveled pinion keyed to said shaft; means for locking said pinion in normal position; another shaft journaled in said frame; a beveled pinion partially provided with teeth keyed to said other shaft and co-acting with said first-mentioned pinion; means for unlocking said first-mentioned pinion to permit its shaft to be turned in one direction; a driven shaft journaled in said frame, and means whereby at certain times energy is transmitted from said driven shaft to said second-mentioned shaft so as to bring the teeth of said second-mentioned pinion into mesh with said first-mentioned pinion to turn said first shaft in the opposite direction.

In testimony whereof I have affixed my signature in presence of two witnesses.

GUY DESMOND GRIFFITHS.

Witnesses:
HAROLD VILLERS BISHOP,
JOHN KERSHAW.